Figure 1:
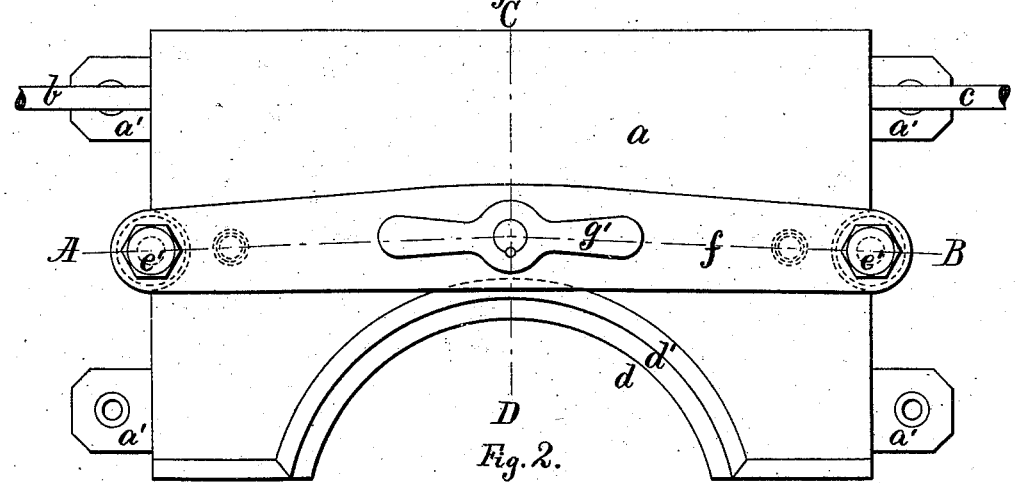

F. G. LAMSON & DeW. C. KING.
Machine for Heating the Edge of Hat-Brims.

No. 224,298. Patented Feb. 10, 1880.

Witnesses:
Henry Chadbourn.
F. Allen.

Inventors:
Frank G. Lamson
De Witt C. King
by their atty

UNITED STATES PATENT OFFICE.

FRANK G. LAMSON AND DE WITT C. KING, OF BOSTON, MASSACHUSETTS.

MACHINE FOR HEATING THE EDGES OF HAT-BRIMS.

SPECIFICATION forming part of Letters Patent No. 224,298, dated February 10, 1880.

Application filed July 17, 1879.

*To all whom it may concern:*

Be it known that we, FRANK G. LAMSON and DE WITT C. KING, both of Boston, in the county of Suffolk and State of Massachusetts, have jointly invented certain new and useful Improvements in Machines for Heating the Edges of Hat-Brims; and we do hereby declare that the following is a full, clear, and exact description of the invention, which will enable others skilled in the art to which it appertains to make and use the same, reference being had to the accompanying drawings, and to letters of reference marked thereon, which form a part of this specification.

Our invention relates to improvements in machines for heating the edges of gossamer, felt, or other stiff hat-brims, preparatory to the turning or curling of such edges; and it consists of a stationary hollow heat-receptacle, made with a concave recess in front large enough to take in one-half of the brim of any size hat, and a movable plate, located below the heat-receptacle, for holding the brim in position during the heating of its edge, which movable plate is provided with a suitable pressure device by means of which it can be pressed up against the heat-receptacle and the brim resting between them, so as to soften the edge of the hat-brim and thus prepare it for the subsequent curling or turning manipulation, that is done by a suitable tool for this purpose.

The concave recess in the front of the heat-receptacle is made inclined from the bottom upward, so as to allow of the brim being heated without heating the crown part of the hat.

By this simple apparatus a great deal of labor and time is saved in heating the edges of hat-brims, for the purpose set forth, as compared with the usual method of heating and softening hat-brims by means of a heated goose, that had to be moved forward and back over the brim.

By the use of this our improved machine we are able to heat one-half of the circumference of the edge of the hat-brim, and after such half of the brim is heated it is curled or turned in the usual manner, after which the remaining one-half of the edge of the brim is similarly heated by inserting it between the heat-receptacle and its movable pressure-plate and compressing it in such a position until sufficiently heated and softened, after which such remaining half of the edge of the brim is also turned or curled, as usual. Finally, the front and rear parts of the edge of the hat-brim are, respectively, heated at the front corners of the heat-receptacle by being there compressed by means of the aforesaid movable plate, as will hereinafter be more fully shown and described.

Figure 2:
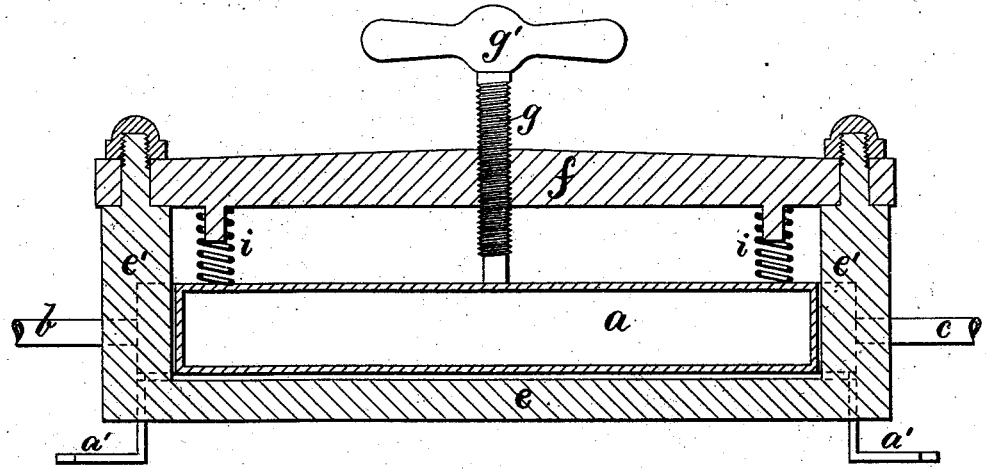

On the accompanying drawings, Figure 1 represents a plan view of our invention. Fig. 2 represents a vertical section on the line A B, shown in Fig. 1; and Fig. 3 represents a cross-section on the line C D, also shown in Fig. 1.

Similar letters refer to similar parts wherever they occur on the different parts of the drawings.

*a* represents the hollow heat-receptacle, preferably heated by steam or hot air, although it may be heated in any other well-known manner. Said receptacle is provided with induction and eduction pipes *b* and *c*, as shown, for the supply and delivery of steam, or hot air, or other heating medium. $a'$ $a'$ $a'$ $a'$ are feet or supports, forming parts of the receptacle *a*, by means of which the latter is secured to a table or work-bench.

Figure 3:
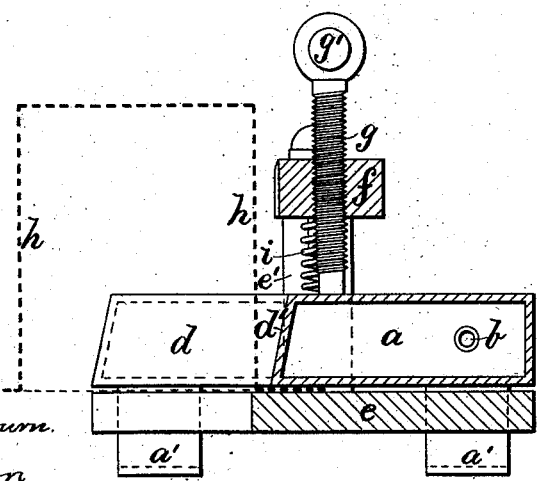

The hollow receptacle *a* has a concave recess, *d*, in front, as shown, for the purpose described, the curved wall of which recess is inclined from the bottom upward, as shown at $d'$ in Fig. 3, for the purpose set forth.

*e* is the movable pressure-plate, located below the heat-receptacle *a*, and provided with upward-projecting standards or rods $e'$ $e'$, that are secured in their upper ends to the longitudinal beam *f*, as shown. *g* is a pressure-screw, adjustable up and down in a screw-threaded perforation in the beam *f*, as shown, its upper end being provided with a suitable handle, $g'$, and its lower end resting against the top of the hollow receptacle *a*, by which arrangement the movable plate *e* is caused to compress the rim of a hat when placed in a position as shown in dotted lines *h h* in Fig. 3, as and for the purpose described.

We do not wish to confine ourselves to the exact pressure devices as shown in the drawings, as similar and equivalent devices—such as, for instance, a cam and lever or inclines— may be used to equal advantage without departing from the spirit of our invention.

*i i* represent yielding springs, interposed between the beam *f* and receptacle *a*, for the purpose of balancing the movable plate *e* during its up-and-down motion.

We are aware of the Letters Patent granted to S. Billings August 7, 1849, No. 6,627, and we wish to state that we do not claim as our invention the device as therein shown and described; but What we wish to secure by Letters Patent and claim is—

In combination with the heat-receptacle *a*, having the concave recess *d d'* and pressure-plate *e*, the adjustable pressure device consisting of the uprights *e' e'*, bar *f*, screw *g g'*, and springs *i i*, or their equivalents, substantially as and for the purpose set forth and described.

In testimony that we claim the foregoing as our own and joint invention we have affixed our signatures in presence of two witnesses.

FRANK G. LAMSON.
DE WITT C. KING.

Witnesses:
ALBAN ANDRÉN,
HENRY CHADBOURN.